(12) United States Patent
Langouet et al.

(10) Patent No.: US 10,248,135 B2
(45) Date of Patent: Apr. 2, 2019

(54) METHOD FOR ADAPTIVELY DRIVING A STEPPER MOTOR, AND CORRESPONDING DEVICE

(71) Applicant: STMicroelectronics (Grand Ouest) SAS, Le Mans (FR)

(72) Inventors: Emmanuel Langouet, Pace (FR); Samuel Rousselin, Rennes (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 0 days.

(21) Appl. No.: 15/608,596

(22) Filed: May 30, 2017

(65) Prior Publication Data
US 2018/0129227 A1    May 10, 2018

(30) Foreign Application Priority Data
Nov. 4, 2016 (FR) ...................... 16 60669

(51) Int. Cl.
| | |
|---|---|
| G05D 3/18 | (2006.01) |
| G04C 3/02 | (2006.01) |
| G05B 19/40 | (2006.01) |
| G06K 13/20 | (2006.01) |
| H02K 37/22 | (2006.01) |
| H02P 8/32 | (2006.01) |
| H02P 8/22 | (2006.01) |

(52) U.S. Cl.
CPC ............. *G05D 3/183* (2013.01); *G04C 3/022* (2013.01); *G05B 19/40* (2013.01); *G06K 13/20* (2013.01); *H02K 37/22* (2013.01); *H02P 8/22* (2013.01); *H02P 8/32* (2013.01)

(58) Field of Classification Search
CPC ........ G05D 3/183; G04C 3/022; G05B 19/40; G06K 13/20; H02P 8/22; H02P 8/32
USPC .......................................................... 318/696
See application file for complete search history.

(56) References Cited

U.S. PATENT DOCUMENTS

| | | | | |
|---|---|---|---|---|
| 5,151,640 A | * | 9/1992 | Sakamoto | H02P 8/14 318/696 |
| 6,664,754 B2 | * | 12/2003 | Misumi | H02P 8/14 318/599 |

(Continued)

FOREIGN PATENT DOCUMENTS

| | | |
|---|---|---|
| EP | 0 831 581 A2 | 3/1998 |
| JP | 9-219995 A | 8/1997 |

*Primary Examiner* — Kawing Chan
(74) *Attorney, Agent, or Firm* — Seed IP Law Group LLP

(57) ABSTRACT

A stepper motor is driven according to step driving modes including a full-step driving mode, a half-step driving mode and micro-stepping modes. The stepper motor may also be driven in an acceleration phase. A method of controlling the stepper motor includes controlling the current step driving mode of the motor by a processing unit. During the acceleration phase of the stepper motor and the stepper motor being in driven in a current step driving mode other than the full-step driving mode, the processing unit tests, after each speed increase, if a remaining computing power of the processing unit is sufficient for control of the stepper motor to remain in the current step driving mode, and if not the processing unit, in presence of a first switching condition, switches control of the stepper motor to the driving mode having the closest coarser step.

28 Claims, 5 Drawing Sheets

(56) References Cited

U.S. PATENT DOCUMENTS

| | | | | |
|---|---|---|---|---|
| 7,701,162 B2* | 4/2010 | Lee | .................... | G11B 7/08505 |
| | | | | 318/696 |
| 2002/0008491 A1* | 1/2002 | Aoshima | ................ | H02K 7/116 |
| | | | | 318/696 |
| 2003/0193611 A1 | 10/2003 | Yoshimura | | |
| 2006/0152187 A1* | 7/2006 | Harada | ................ | G05B 19/231 |
| | | | | 318/685 |
| 2009/0026996 A1 | 1/2009 | Nakane et al. | | |

* cited by examiner

METHOD FOR ADAPTIVELY DRIVING A STEPPER MOTOR, AND CORRESPONDING DEVICE

BACKGROUND

Technical Field

Embodiments of the present disclosure relate generally to motion control for stepper motors, and more particularly to micro-step driving for stepper motors, for example stepper motors located within an electronic apparatus, such as a printer, a 3D printer, a consumer DSC ("Digital Still Camera") or a security camera.

Description of the Related Art

Micro-step driving or more commonly known as micro-stepping is a driving technique generally used to achieve accurate positioning with stepper motors.

Micro-stepping allows advantageously a stepper motor to reach positions which are located between two of its mechanical steps with a greater resolution than half-step driving. These intermediate positions are commonly defined as micro-steps.

Therefore, a micro-stepping mode of a stepper motor is the number 1/N where N is the number of micro-steps between two mechanical steps of the stepper motor.

In general, the value of N is 2n where n is an integer greater than 1. The most common micro-stepping modes are ¼, ⅛, ¹⁄₁₆, etc.

Consequently, a stepper motor is capable of running in different step driving modes including full-step driving mode, half-step driving mode and several micro-stepping modes with different resolutions. A processing unit such as a microcontroller unit ("MCU") is commonly used for controlling these different step driving modes of a stepper motor.

However, since control and computing operation has to be performed by the processing unit before each micro-step moves and the processing unit may simultaneously have other tasks to process, conventional micro-stepping requires a very high computing power of the processing unit, which is very (hard to be satisfied all the time. This situation can be even harder when the motor speed gets to be higher because the increasing motor speed results in less time for the control and computing operations.

Thus, the speed of conventional stepper motor applications requiring a micro-step positioning is limited by the computing power of the processing unit in a static way.

As a result, the speed and the precision of such a conventional stepper motor application is not optimized taking into account the computing power of the processing unit in real time.

BRIEF SUMMARY

According to an embodiment, it is proposed an adaptive method and a corresponding device for driving a stepper motor in a dynamic way in order to apply always the finest possible micro-stepping if the computing power of the processing unit for controlling the stepper motor allows doing so.

According to an embodiment, it is proposed such a method and such a device which limit the vibration of the stepper motor when the step driving mode is switched from the coarsest to the finest, or in the reverse way.

It is also proposed, according to an embodiment, to provide an advantageous option for either increasing the torque of the stepper motor or reducing its vibration.

According to an embodiment, it is proposed to automatically adapt the micro-stepping mode to maximize the motor speed according to the targeted position. In this purpose, when the remaining computing power decreases, typically when the motor speed is increasing, the processing unit switches the step driving mode from the finest micro-stepping mode to the coarsest, and if it is still not enough, to half and then full step driving. Conversely, when the remaining computing power increases, typically when the motor speed is decreasing or when it is approaching a targeted position which requires precision, the processing unit switches the step driving mode progressively. It changes it from full to half step driving, and then from the coarsest step driving mode up to the finest one in such way that the required accuracy to reach the targeted position is preserved.

According to an aspect, it is thus proposed a method for driving a stepper motor. The motor is being driven according to step driving modes including full-step driving mode, half-step driving mode and micro-stepping modes. The method comprises controlling the current step driving mode of the motor by a processing unit.

According to a general feature of this aspect, during an acceleration phase of the motor being in a current step driving mode other than the full-step driving mode, the processing unit tests, after each speed increase, if its remaining computing power is sufficient for remaining in said current step driving mode and if not switches to the closest coarser step driving mode in presence of a first switching condition.

Such a method allows advantageously adapting the current step driving mode to the remaining computing power of the processing unit in real time. With the increase of the motor speed, the time for computing the control parameters between two neighbor steps becomes shorter and shorter. Switching to the closest coarser step driving mode in presence of a first switching condition can reduce not only the workload of the processing unit but also the time for reaching the target position since the length of the micro-step is increased in the closest coarser step driving mode.

The first switching condition can for example include a correspondence of the current position of the motor in said current step driving mode with a position defined in said closest coarser step driving mode.

It should be noted that the length of the micro-step in said current step driving mode is shorter than that in said closest coarser step driving mode. If the current position of the motor is located in the middle of two neighbor micro-steps of said closest coarser step driving, said motor will not be able to perform a new micro step of said closest coarser step driving mode until said current position moves to a position defined in said closest coarser step driving mode. In other words, it needs to perform at least one new step in said current step driving mode.

The motor comprises motor phases, for example two motor phases for a bipolar motor. In this case, a micro-step driving is achieved by applying a pair of discretized sine and cosine values to the stepper motor phases and an electronic control circuit well known by those skilled in the art and commonly known as H bridge is used in said motor. Currents for different phases can be observed in the H bridge and these currents vary with the micro-step moves.

The first switching condition can further preferably include a minimum current gap on the motor phases.

This permits ensuring that every switching from said current step driving mode to the closest coarser step driving is performed with minimum vibration.

According to an embodiment, testing comprises evaluating the computing time needed to determine control parameters to be applied to the motor in order for the motor to reach the next position in said current step driving mode and determining the switching time required by the motor to actually switch to said next position taking into account the current speed of the motor. The remaining computing power is sufficient for remaining in said current step driving mode if said switching time is greater than or equal to said computing time plus a first margin.

In absence of said first switching condition, at least one new step can be performed by the motor in said current step driving mode. The first margin can be adapted for allowing the performance of said at least one new step in said current step driving mode.

This first margin is advantageously greater than a first parameter equal to the length of a micro-step in said current step driving mode divided by the product of the acceleration and the switching time, and may be typically greater than or equal to the sum of said first parameter and a time reserved for the dynamical needs of the other tasks to be run by the microcontroller unit (MCU).

Depending on the application the man skilled in the art will be able to determine the appropriate value for this first margin.

According to another embodiment, during a deceleration phase of the motor being in a current step driving mode other than the finest micro-stepping mode, the processing unit tests, after each speed decrease, if a second switching condition is fulfilled for switching into the closest finer step driving mode.

For example, said second switching condition can comprise verifying if the remaining computer power of the processing unit is sufficient for allowing switching to said closest finer step driving mode.

This permits advantageously the processing unit to switch progressively from the current step driving mode to the finest possible step driving mode during the deceleration phase so as to take into account the remaining computing power of the processing unit and the precision of micro-step moves.

The verifying can comprise evaluating the computing time needed to determine control parameters to be applied to the motor in order for the motor to reach the next position in said current step driving mode, determining the switching time required by the motor to actually switch to said next position taking into account the current speed of the motor, and determining that said remaining computing power is sufficient for allowing switching to said closest finer step driving mode if said switching time is greater than or equal to said computing time plus a second margin.

The second margin is advantageously greater than a second parameter equal to the difference between the current switching time in said current step driving mode and the next switching time in said closest finer step driving mode, and may be typically greater than or equal to the sum of said second parameter and a time reserved for the dynamical needs of the other tasks to be run by the processing unit.

Depending on the application the man skilled in the art will be able to determine the appropriate value for this second margin.

The second margin may be different from or equal to the first margin.

According to another embodiment, if said remaining computer power is not sufficient for allowing switching to said closest finer current driving mode, if the difference between the final position and the current position of the motor is smaller than one full step and if said final position is not accessible with the current step driving mode, the motor speed is decreased for obtaining a sufficient remaining computer power for allowing switching to said closest finer step driving mode.

According to another embodiment, said second switching condition further includes a minimum current gap on the motor phases of the motor.

For the first switching condition, this permits to smooth every switching from the current step driving mode to the closest finer step driving mode with a minimum vibration.

In case said second switching condition is not fulfilled, a new step can be performed by the motor in said current step driving mode.

According to another embodiment, when the motor is running at constant speed, the current step driving mode is progressively changed till reaching the full step driving mode whatever the remaining computing power.

Such a way of driving the motor at constant speed permits to increase the output torque of the motor by changing the current step driving mode to the coarsest possible step driving mode. In this case, the remaining computing power is not verified since the micro-step is turning into greater and greater when the motor speed is constant. As a result, the time for the control and computing operations and the remaining computing power are getting more and more adequate.

According to yet another embodiment, when the motor is running at constant speed, the current step driving mode may be progressively changed till reaching the finest possible step driving mode.

In this mode, the current step driving mode is changed in the reverse direction with respect to the previous mode for driving the motor at constant speed. The use of the finest possible micro-step is aimed to minimize the vibration of the motor when it is running in its steady mode (i.e., constant speed). The remaining computing power is verified here because the time for the control and computing operations is getting less and less adequate since the micro-step is also turning into shorter and shorter.

According to another aspect, it is proposed a device for driving a stepper motor. The motor is configured to be driven according to step driving modes including full-step driving mode, half-step driving mode and micro-stepping modes. The device comprises a processing unit for controlling the current step driving mode of the motor.

According to a general feature of this other aspect, during an acceleration phase of the motor being in a current step driving mode other than the full-step driving mode, the processing unit is configured to test, after each speed increase, if its remaining computing power is sufficient for remaining in said current step driving mode and if not to switch to the closest coarser step driving mode in presence of a first switching condition.

According to an embodiment, the said first switching condition includes a correspondence of the current position of the motor in said current step driving mode with a position defined in said closest coarser step driving mode.

According to an embodiment, said motor comprises motor phases, and said first switching condition further includes a minimum current gap on the motor phases.

According to another embodiment, during said testing, the processing unit is configured to evaluate the computing time needed to determine control parameters to be applied to the motor in order for the motor to reach the next position in said current step driving mode, to determine the switching time required by the motor to actually switch to said next position taking into account the current speed of the motor, and said remaining computing power is sufficient for remaining in said current step driving mode if said switching time is greater than or equal to said computing time plus a first margin.

According to this other embodiment, in absence of said first switching condition, the processing unit is configured to control the motor to perform at least one new step in said current step driving mode, said first margin being adapted for allowing the performance of at least one new step in said current step driving mode.

According to yet another embodiment, wherein during a deceleration phase of the motor being in a current step driving mode other than the finest micro-stepping mode, the processing unit is configured to test, after each speed decrease, if a second switching condition is fulfilled for switching to the closest finer step driving mode.

As an example, said second switching condition can comprise verifying if the remaining computer power of the processing unit is sufficient for allowing switching to said closest finer step driving mode.

According to an embodiment, during said verifying, the processing unit is configured to evaluate the computing time needed to determine control parameters to be applied to the motor in order for the motor to reach the next position in said current step driving mode, to determine the switching time required by the motor to actually switch to said next position taking into account the current speed of the motor, and to determine that said remaining computing power is sufficient for allowing switching to said closest finer step driving mode if said switching time is greater than or equal to said computing time plus a second margin.

According to an embodiment, if said remaining computer power is not sufficient for allowing switching to said closest finer step driving mode, if the difference between the final position and the current position of the motor is smaller than one full step and if said final position is not accessible with the current step driving mode, the processing unit is configured to decrease motor speed for obtaining a sufficient remaining computer power for allowing switching to said closest finer step driving mode.

For example, said second switching condition can further include a minimum current gap on the motor phases of the motor.

According to an embodiment, if said second switching condition is not fulfilled, the processing unit is configured to control the motor to perform a new step in said current step driving mode.

According to another embodiment, when the motor is running at constant speed, the processing unit is configured to change progressively the current step driving mode till reaching the full step driving mode whatever its remaining computing power.

According to still another embodiment, when the motor is running at constant speed, the processing unit is configured to change progressively the current step driving mode till reaching the finest possible step driving mode.

According to still another aspect, it is proposed a system, such as optical lens autofocus or 3D printer, comprising at least one stepper motor and at least one device as defined above.

BRIEF DESCRIPTION OF THE SEVERAL VIEWS OF THE DRAWINGS

Other advantages and features of the present disclosure will appear on examining the detailed description of embodiments, these being in no way limiting, and of the appended drawings in which.

DETAILED DESCRIPTION

Figure 1:
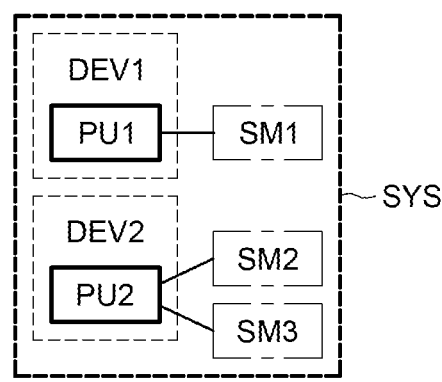
FIGS. 1 to 6 illustrate diagrammatically embodiments of the present disclosure.

Embodiments of the present disclosure will be now described in the technical field of micro-step driving for stepper motors, which can be found for example in a system SYS such as a consumer digital still camera DSC as illustrated in FIG. 1.

The system SYS comprises here two devices DEV1 and DEV2 each respectively including one processing unit PU1 and PU2, for example here two microcontroller units (commonly known as "MCU"), and several corresponding stepper motors SM1 to SM3. For example, the first processing unit PU1 is configured to drive the first stepper motor SM1 while the second processing unit PU2 is designed to drive simultaneously the second and the third stepper motors SM2 and SM3.

Figure 2:
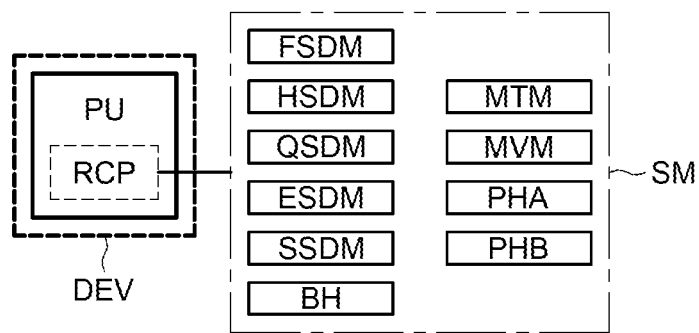

For the sake of clarity and simplicity, we will now refer to FIG. 2 in order to illustrate an example of a device DEV comprising a processing unit PU and a single stepper motor SM driven by the processing unit PU according to the present disclosure.

The processing unit PU coupled to the stepper motor SM is configured to adaptively determine a step driving mode of the motor SM among several step driving modes including full-step driving mode FSDM, half-step driving mode HSDM, and micro-stepping modes.

In the present non limitative example, there are three micro-stepping modes. The coarsest one is a quarter-step driving mode QSDM. The finest one has number $\frac{1}{16}$ and is referenced SSDM. The other micro-stepping mode has number $\frac{1}{8}$ and is referenced ESDM.

Of course the present disclosure is not limited to those three micro-stepping modes. Other finer micro-stepping modes are possible.

General speaking, the full-step driving mode FSDM is the coarsest step driving mode among all the step driving modes mentioned above and the finest step driving mode is here the finest micro-stepping mode.

As indicated by its name, the length of each micro-step in the sixteenth-step driving mode SSDM corresponds to one-sixteenth of the length of a step in the full-step driving mode FSDM.

General speaking, the processing unit PU is configured to automatically adapt the step driving mode of the stepper motor SM to maximize the motor speed according to a targeted position TD.

To this end, when the remaining computing power RCP of the processing unit PU decreases, typically due to an increase of the motor speed or other parallel tasks in processing, the processing unit PU switches the step driving mode from the finest micro-stepping mode SSDM to the coarsest one QSDM, and, if the remaining computing power RCP is still not enough, to half-step HSDM and then full-step driving mode FSDM.

In the similar manner but in a reverse way, when the remaining computing power RCP increases, typically due to a decrease of the motor speed or a release of other tasks in processing, or the stepper motor SM is approaching a targeted position TD which requires more precision, the processing unit switches progressively the step driving mode from the full-step driving mode FSDM to the half-step driving mode HSDM, and then from the coarsest micro-stepping mode QSDM to the finest micro-stepping mode SSDM. In such a way, the required accuracy to reach the targeted position TD is satisfied.

When the stepper motor SM runs in a steady mode at a constant speed, the processing unit PU provides advantageously two special modes including a maximized torque mode MTM for maximizing the torque of the stepper motor SM at the constant speed and a minimized vibration mode MVM for minimizing the vibrations for the given constant speed.

The stepper motor SM has also several motor phases, for example here two phases PHA and PHB, and an electronic control circuit known as bridge H. Depending on positions of the stepper motor, the different currents generated by the bridge H correspond to the different phases PHA and PHB.

With a bipolar stepper motor, a microstep driving is achieved by applying a pair of discretized sine and cosine to the stepper motor phases:

$$I_{PHA}(n) = I_{max} \sin(\pi n / 2N)$$

$$i\ I_{PHB}(n) = I_{max} \cos(\pi n / 2N)$$

where n ranges from 0 to 4N.

It should be noted that the processing unit PU limits equally the vibrations during all the switches between any two neighbor step driving modes since these switches are performed preferably when the current gap on the motor phases are minimum.

Figure 3:
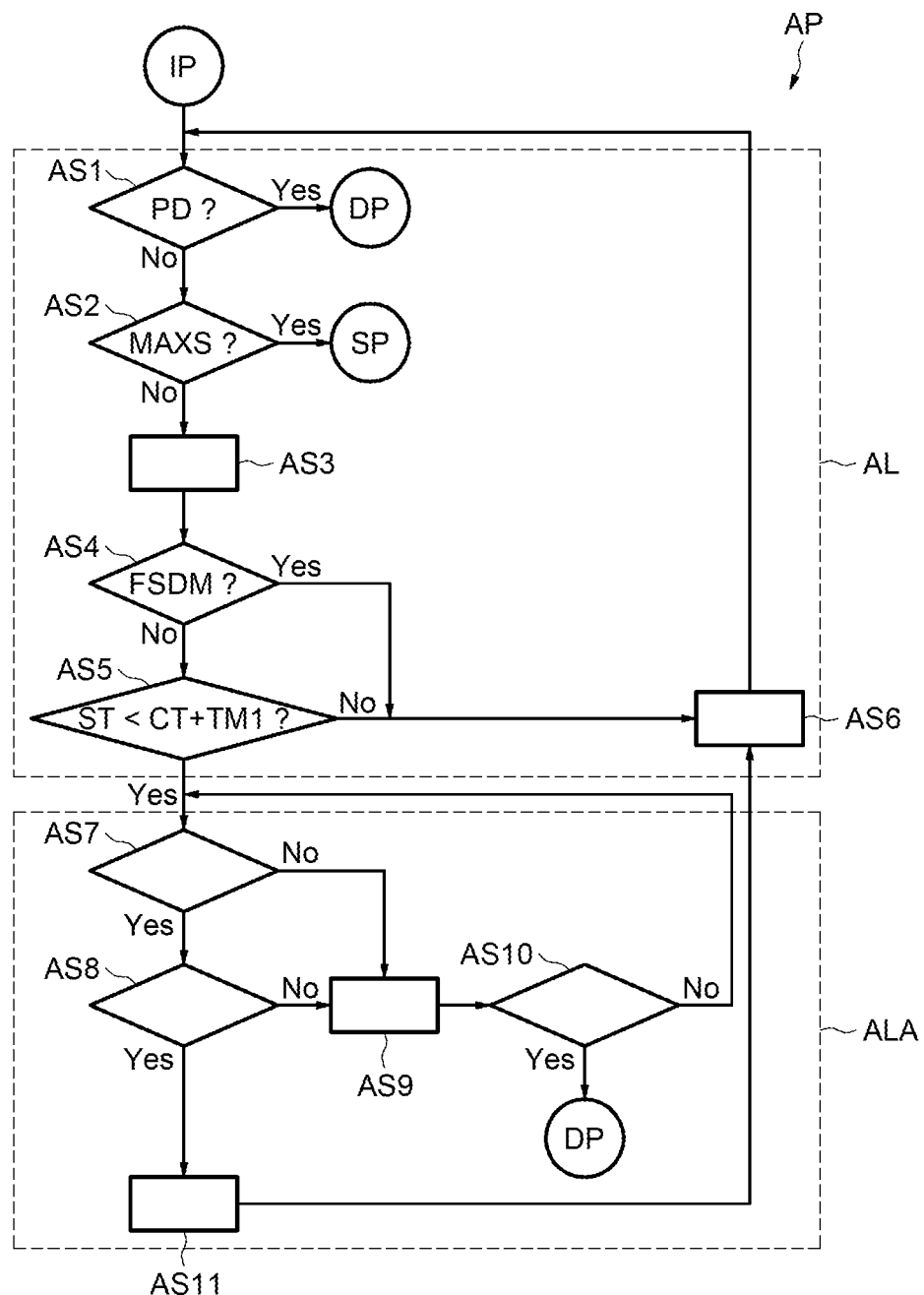

We now refer to FIG. 3 to describe, in details, the operation of the device DEV in a typical case of an acceleration phase AP in which the remaining computing power RCP of the processing unit PU normally decreases.

As we can observe, FIG. 3 is basically composed of two sets of steps:
  a first set of steps: the acceleration loop AL
  a second set of steps: the micro-stepping mode adaptation loop for acceleration ALA.

At each motor move during the acceleration phase AP, either the acceleration loop AL or the micro-stepping mode adaptation loop ALA is executed by the processing unit PU.

At the beginning of the acceleration phase AP, the stepper motor starts always from a known initial position IP.

Depending on a given speed profile comprising different parameters such as acceleration, initial speed, maximum speed, etc., the processing unit PU increases progressively the motor speed.

According to the distance between the initial position IP and the targeted position TD and the speed profile, the processing unit is configured to determine a position of deceleration PD corresponding to the beginning of the deceleration phase DP, which will be described later in details with reference to the FIG. 4.

Thus, the processing unit PU is configured to check in step AS1 if the current position corresponds to the position of deceleration PD. If it is the case, the processing unit PU switches directly to the deceleration phase DP. If not, in step AS2, the current motor speed is verified by the processing unit PU.

If the maximum motor speed MAXS is attained, the processing unit PU switches to the steady phase SP in which the stepper motor SM runs at the constant maximum motor speed MAXS.

Otherwise, the processing unit PU will increase the motor speed in step AS3.

In step AS4, the processing unit PU verifies if the current step driving mode is the full-step driving mode FSDM. If so, the stepper motor SM performs a new full step (AS6) and the processing unit PU will restart from step AS1.

If the current step driving mode is other than the full-step driving mode FSDM, the processing unit PU is configured to evaluate the switching time ST before the next step of the motor SM has to be executed. The processing unit PU determines also the computing time CT needed to determine control parameters to be applied to the motor SM in order for the motor SM to reach the next position after the next step performed in the current step driving mode.

A first temporal margin TM1 allowing the performance of at least one new step in said current step driving mode is also taken into account by the processing unit in order to determine, in step AS5, if said switching time ST is shorter than the sum of the needed computing time CT and the first temporal margin TM1.

If it is the case, which means that there is not enough remaining computing power RCP of the processing unit PU for remaining in the current step driving mode, the processing unit is configured to enter the micro-stepping mode adaptation loop ALA.

In the other case, the processing unit PU drives the motor SM to perform, in step AS6, a new step in the current step driving mode and then return to step AS1.

This first margin TM1 is advantageously greater than a first parameter equal to the length of a micro-step in said current step driving mode divided by the product of the acceleration and the switching time, and may be typically greater than or equal to the sum of said first parameter and a time reserved for the dynamical needs of the other tasks to be run by the microcontroller unit PU.

In step AS7, the current position of the stepper motor SM is compared to a closest position defined in the coarser step driving mode. The aim of step AS7 is to verify if the current position corresponds to a position defined in the closest coarser step driving mode.

If this is the case, the processing unit PU is configured to verify, in step AS8, if the current gap on the said H bridge HB of the stepper motor SM is minimum so as to ensure a minimum vibration during a potential switch of step driving mode.

In the case there is no correspondence between the current position and a position defined in the closest coarser step driving mode or the current gap is not minimum on the bridge H of the motor SM, a new step in the current step driving mode is performed in step AS9 and then another check of the new current position is performed in step AS10 to verify if the processing unit PU should switch to the deceleration phase DP. If not, the processing unit PU restarts from step AS7.

If the current gap measured on the bridge H of the motors is minimum, the processing unit PU is configured to switch the current step driving mode to the closest coarser step mode in step AS11.

A new step in the closest coarser step mode is then executed in step AS6 before the restart from step AS1.

Figure 4:
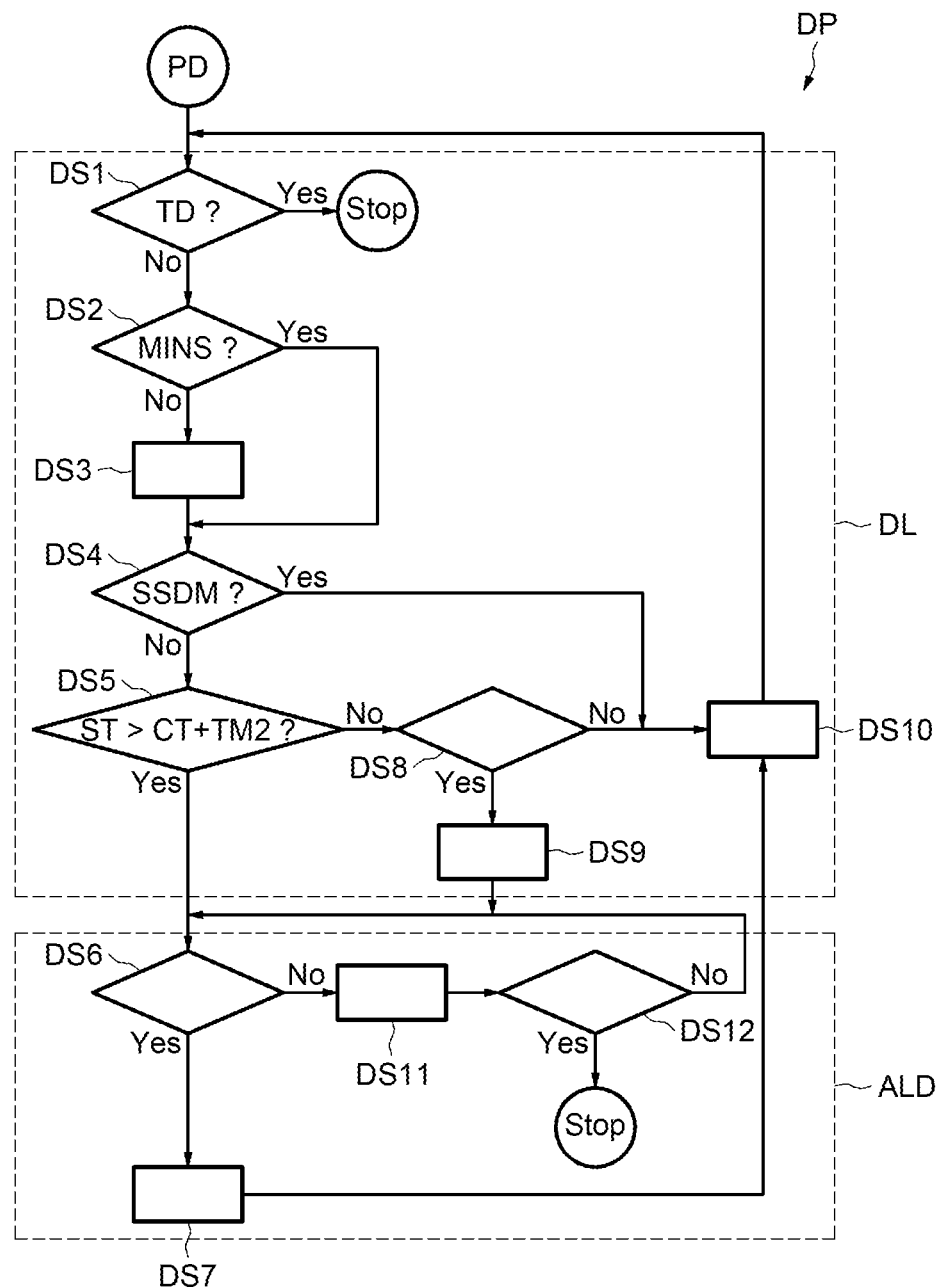

We now refer to FIG. 4 to describe, in details, the operation of the device DEV in a typical case of the deceleration phase DP in which the remaining computing power RCP of the processing unit PU normally increases.

The deceleration phase DP starts from the position of the deceleration PD determined by the processing unit PU when the stepper motor is still running.

Similar with what is presented in acceleration phase AP, the deceleration phase DP is basically composed of two sets:
- a first set of steps: the deceleration loop DL
- a second set of steps: the micro-stepping mode adaptation loop ALD.

At the beginning of the deceleration loop DL, the processing unit PU is configured to verify in step DS1 if the current position corresponds to the targeted position TD.

If it is already the case, the processing unit PU is then configured to stop immediately the motor SM.

If not, the processing unit PU checks then, in step DS2, if the minimum speed MINS of the stepper motor SM is reached.

If the motor SM is currently running at the minimum speed MINS, step DS3 will be skipped. Otherwise the processing unit PU speeds down the motor SM, in step DS3.

In step DS4, the current step driving mode is checked to verify if it is the finest micro-stepping mode SSDM.

If it is still not the case, the processing unit PU is configured to evaluate, in step DS5, the switching time ST before the next step of the motor SM has to be executed as well as the computing time CT and a second temporal margin TM2 in order to determine if there is enough remaining computing power RCP to switch to the closest finer step driving mode in step DS7 after a positive current gap check in step DS6.

If the remaining computing power RCP is determined as being not enough in step DS5, the processing unit PU is then configured to verify, in step DS8, if the targeted position TD is within one full step with respect to the current position and if it is not accessible with current step driving mode.

In fact, the aim of step DS8 is to check if the distance between the current position and the targeted position TD and the step length of the current step driving mode impose a switch to a finer step driving mode.

If this is the case, the processing unit PU is configured to decrease, in step DS9, the motor speed until the remaining computing power RCP of the processing unit PU is determined as enough. In other words, the switching time ST is to be greater than or equal to the sum of the computing time CT and the second temporal margin TM2.

The second temporal margin TM2 is advantageously greater than a second parameter equal to the difference between the current switching time in said current step driving mode and the next switching time in said closest finer step driving mode, and may be typically greater than or equal to the sum of said second parameter and a time reserved for the dynamical needs of the other tasks to be run by the processing unit PU.

If the current position is not within a full step from the targeted position TD or is still accessible with the current step driving mode, the processing unit performs, in step DS10, a new step in the current step driving mode before returning to step DS1.

If the current gap check in step DS6 is not satisfied, a new step in the current step driving mode is performed in step DS11.

The processing unit PU is configured to verify if the current position corresponds to the targeted position TD. The motor SM will be stopped if it is the case, otherwise the processing unit PU is configured to re-execute step DS6 just like after step DS9.

In the end, if the current gap check is satisfied in step DS6, the processing unit PU is configured to switch the current step driving mode to the closest finer step mode before performing a new step in this closest finer step mode in step DS10 of the deceleration loop DL.

Figure 5:
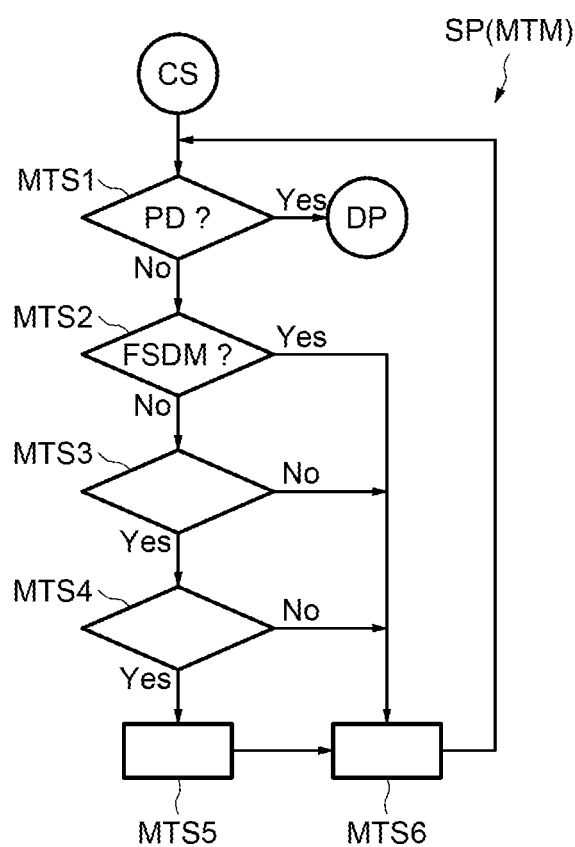
Figure 6:
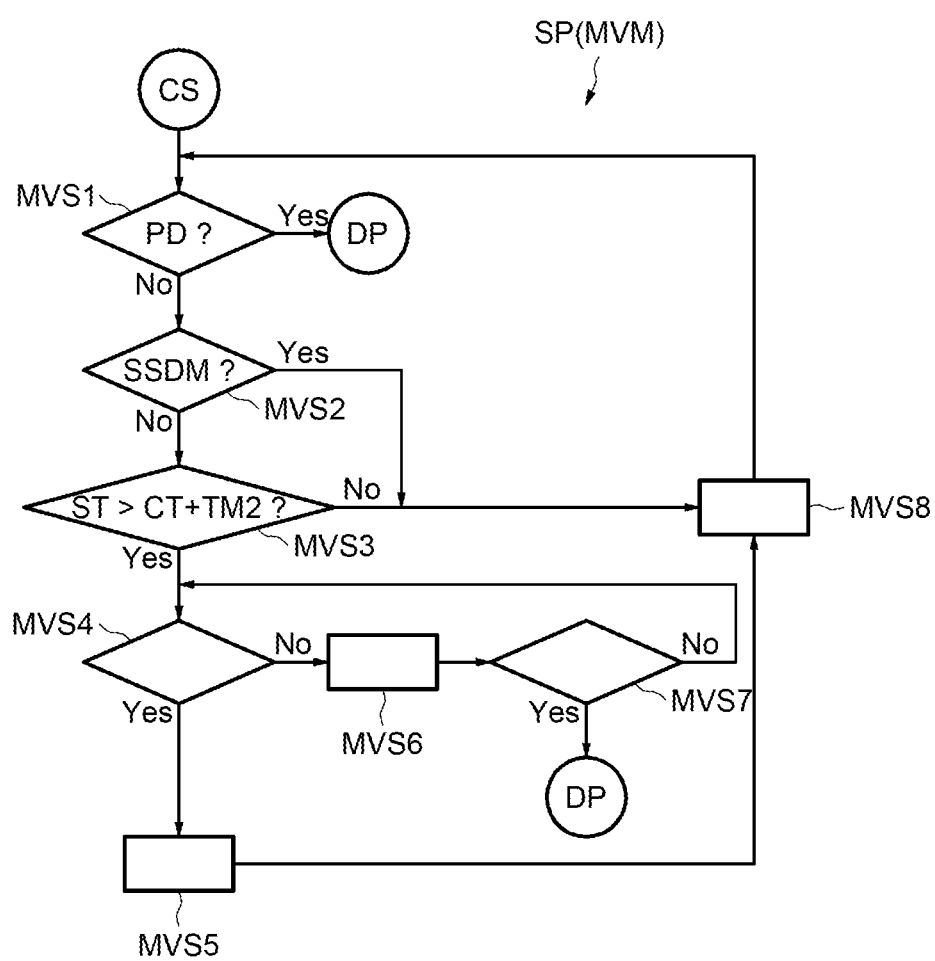

We now refer to FIGS. 5 and 6 to illustrate respectively the operation of the device DEV in a maximum torque mode MTM and a minimum vibration mode MVM when the stepper motor is in a steady phase SP.

In the case of the maximum torque mode MTM which is illustrated in the FIG. 5, the steady phase SP always starts with the motor SM running at constant speed CS.

In step MTS1, the processing unit PU is configured to verify if the current position corresponds to the position of the deceleration PD determined by the processing unit PU. A switch to the decelerating phase DP is planned if it is the case.

Otherwise, the processing unit PU continues to verify, in step MTS2, if the current step driving mode is the full-step driving mode.

If this condition is satisfied, the processing unit PU performs a new step in the current step driving mode in a step MTS6 before returning to the beginning MTS1 of the steady phase SP.

If this condition is not satisfied, the processing unit PU continues to verify, in step MTS3, if the current position corresponds to a position defined in the closest coarsest step mode.

If this is the case, the processing unit PU is configured to perform a current gap check in step MTS4 before a potential switch to the closest coarser step mode in step MTS5.

If the verification in steps MTS3 or MTS4 is negative, the switch to the closest coarser step mode will not be executed and a new step in the current step driving mode is performed in step MTS6.

In this way, the processing unit PU is configured to ensure a maximum torque mode MTM during the steady phrase SP.

Turning to the minimum vibration mode MVM as illustrated in the FIG. 6, the steady phase SP always starts with the motor SM running at constant speed CS as mentioned in the maximum torque mode MTM.

In the same manner, step MVS1 is performed to verify if the current position corresponds to the position of deceleration PD.

A switch to the deceleration phase DP is executed if this condition is satisfied.

Otherwise, the processing unit PU checks (MVS2) if the current step driving mode is the finest step driving mode, which means here the sixteenth-step driving mode SSDM.

If it is not the case, the processing unit PU is configured to verify (MVS3) if there is enough remaining computing power RCP of the processing unit PU (i.e., if the said switching time ST is greater than or equal to the sum of the said computing time CT and the said second temporal margin TM2).

If the remaining computing power RCP is determined as being not enough or the current step driving mode is already the finest step driving mode, a new step of the motor SM in the current step driving mode is performed in step MVS8 before returning to step MVS1.

In the case that there is enough remaining computing power RCP, the processing unit PU executes a current gap check in step MVS4.

If satisfied, a switch to the closest finer step driving mode is executed by the processing unit PU in the fifth minimum vibration step MVS5 before joining the eighth minimum vibration step MVS8 for performing a new step in the closest finer step driving mode.

Otherwise, a new step is performed in the current step driving mode in step MVS6 before verifying (MVS7) if the current position corresponds to the position of the deceleration PD for switching to the deceleration phase DP.

If the position of the deceleration PD is not yet reached, a return to the current gap check (MVS4) is planned by the processing unit.

In this way in this minimum vibration mode, the motor SM runs in the finest possible step driving mode during the steady phase such that the vibration of the motor SM is minimized.

In this minimum vibration mode, the finest possible step driving mode is not always reachable even if the motor speed is constant since the said switching time ST decreases with the finest possible step driving mode in the steady phase SP. As a result, the remaining computing power RCP may be not always enough for performing a switch to the closest finer step driving mode.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for driving a stepper motor, comprising:
controlling the stepper motor in a current step driving mode of the stepper motor and in an acceleration phase of the stepper motor, the current step driving mode including a full-step driving mode, a half-step driving mode, and micro-stepping driving modes;
determining, if the current step driving mode is not the full-step driving mode and the stepper motor is being controlled in the acceleration phase, after each speed increase of the stepper motor whether a remaining computing power associated with controlling the stepper motor in the current step driving mode is sufficient for the stepper motor to remain being controlled in the current step driving mode; and
switching to one of the full-step, half-step, and micro-stepping driving modes having a closest coarser step in presence of a first switching condition in response to determining the remaining computing power is not sufficient for the stepper motor to remain being controlled in the current step driving mode, wherein switching to the one of the step full-step, half-step, and micro-stepping driving modes having a closest coarser step in presence of the first switching condition further includes said first switching condition including a correspondence of a current position of the motor in said current step driving mode with a position of the motor defined in said one of the full-step, half-step, and micro-stepping driving modes having the closest coarser step.

2. The method according to claim 1, wherein controlling said stepper motor comprises controlling motor phases of the stepper motor, and wherein switching to one of the full-step, half-step, and micro-stepping driving modes having a closest coarser step in presence of the first switching condition comprises said first switching condition further including a minimum current gap on the motor phases.

3. The method according to claim 1, wherein determining whether the remaining computing power associated with controlling the stepper motor in the current step driving mode is sufficient comprises:
evaluating a computing time needed to determine control parameters to be applied to the stepper motor in order for the stepper motor to reach a next position in said current step driving mode; and
determining a switching time required by the stepper motor to switch to said next position taking into account a current speed of the stepper motor; and
determining the remaining computing power is sufficient for remaining in said current step driving mode if said switching time is greater than or equal to said computing time plus a first margin.

4. The method according to claim 3, wherein determining the remaining computing power is sufficient further comprises the first margin being greater than a first parameter equal to a length of a micro-step in said current step driving mode divided by the product of an acceleration and said switching time.

5. The method according to claim 4, further comprising, in absence of said first switching condition, controlling the stepper motor in said current step driving mode for at least one new step in said current step driving mode, and wherein determining the remaining computing power comprises determining a value of said first margin that allows for performing said at least one new step in said current step driving mode.

6. The method according to claim 1, further comprising controlling the stepper motor in a deceleration phase, wherein the controlling the stepper motor in the deceleration phase comprises, if the stepper motor is being controlled in the current step driving mode other than a finest one of the micro-stepping modes, evaluating, after each speed decrease of the stepper motor, if a second switching condition is fulfilled to permit switching control of the stepper motor into the one of the full-step, half-step, and micro-stepping driving modes having a closest finer step.

7. The method according to claim 6, wherein evaluating, after each speed decrease of the stepper motor, if the second switching condition is fulfilled comprises said second switching condition including verifying if the remaining computer power is sufficient for allowing switching control of said stepper motor to said one of the full-step, half-step and micro-stepping driving modes having the closest finer step.

8. The method according to claim 7, wherein verifying if the remaining computing power is sufficient comprises:
evaluating a computing time needed to determine control parameters to be applied to the stepper motor in order for the stepper motor to reach a next position in said current step driving mode;
determining a switching time required by the stepper motor to switch to said next position taking into account the current speed of the stepper motor; and
determining that said remaining computing power is sufficient for allowing switching the stepper motor to said one of the full-step, half-step and micro-stepping driving modes having the closest finer step if said switching time is greater than or equal to said computing time plus a second margin.

9. The method according to claim 8, wherein determining that said remaining computing power is sufficient further comprises the second margin being greater than a second parameter equal to the difference between the current switching time in said current step driving mode and a next switching time in said driving mode having the closest finer step.

10. The method according to claim 9, wherein if determining that said remaining computing power is sufficient determines said remaining computer power is not sufficient for allowing switching to said driving mode having the closest finer step, then determining if a difference between a final position and a current position of the motor is smaller than one full step of the current driving mode, and if said final position is not accessible with the current step driving mode, decreasing the speed of the stepper motor for obtaining a sufficient remaining computer power for allowing switching to said one of the full-step, half-step and micro-stepping driving modes having the closest finer step.

11. The method according to claim 10, wherein controlling said stepper motor comprises controlling motor phases of the stepper motor, and wherein evaluating, after each speed decrease of the stepper motor, if the second switching condition is fulfilled comprises said second switching condition further including a minimum current gap on the motor phases.

12. The method according to claim 11, further comprising, if said second switching condition is not fulfilled, controlling the stepper motor for a new step in said current step driving mode.

13. The method according to claim 1, further comprising progressively changing, responsive to the stepper motor running at a constant speed, the current step driving mode until reaching the full step driving mode independent of the remaining computing power.

14. The method according to claim 1, further comprising progressively changing, in response to the stepper motor running at constant speed, the current step driving mode until reaching a finest one of the micro-stepping modes.

15. A device for driving a stepper motor configured to be driven in step driving modes including a full-step driving mode, a half-step driving mode and micro-stepping modes, and the stepper motor configured to be driven in an acceleration phase, the device comprising a processing unit configured to control a current step driving mode of the motor and, in response to the stepper motor being driven in the acceleration phase and the current step driving mode being other than the full-step driving mode, the processing unit configured to determine, after each speed increase of the motor in the acceleration phase, if a remaining computing power of the processing unit is sufficient for continuing to control the stepper motor in said current step driving mode and, if the remaining computing power is not sufficient, to switch control of the stepper motor to a closest coarser step driving mode in presence of a first switching condition including a correspondence of a current position of the stepper motor in said current step driving mode with a position defined in said step driving mode having the closest coarser step.

16. The device according to claim 15, wherein said stepper motor includes motor phases, and wherein said first switching condition further comprises a minimum current gap on the motor phases.

17. A device for driving a stepper motor configured to be driven in step driving modes including a full-step driving mode, a half-step driving mode and micro-stepping modes, and the stepper motor configured to be driven in an acceleration phase, the device comprising a processing unit configured to control a current step driving mode of the motor (SM) and, in response to the stepper motor being driven in the acceleration phase and the current ep driving mode being other than the full-step driving mode, the processing unit configured to determine, after each speed increase of the motor in the acceleration phase, if a remaining computing power of the processing unit is sufficient for continuing to control the stepper motor in said current step driving mode and, if the remaining computing power is not sufficient, to switch control of the stepper motor to a closest coarser step driving mode in presence of a first switching condition, wherein the processing unit is further configured to evaluate a computing time needed to determine control parameters to be applied to the stepper motor in order for the stepper motor to reach a next position in said current step driving mode, and is configured to determine a switching time required by the stepper motor to switch to said next position based on a current speed of the stepper motor, and wherein said processing unit is configured to determine said remaining computing power is sufficient to remain in said current step driving mode if said switching time is greater than or equal to said computing time plus a first margin.

18. The device according to claim 17, wherein the first margin is greater than a first parameter equal to a length of a micro-step in said current step driving mode divided by the product of an acceleration and said switching time.

19. The device according to claim 18, wherein the processing unit is configured, in response to said first switching condition not being satisfied, to control the stepper motor to perform at least one new step in said current step driving mode, wherein said first margin has a value to allow the performance of at least one new step in said current step driving mode.

20. The device according to claim 19, wherein the stepper motor is further configured to be driven in a deceleration phase, and wherein the processing unit is further configured, in response to the stepper motor being driven in a current step driving mode other than a finest one of the micro-stepping modes, to determine, after each speed decrease of the stepper motor in the deceleration phase, if a second switching condition is fulfilled to allow switching of the stepper motor to the driving mode having a closest finer step.

21. The device according to claim 20, wherein the processing unit is further configured, in determining whether said second switching condition is fulfilled, to verify if the remaining computer power of the processing unit is sufficient for allowing switching of the stepper motor to said driving mode having the closest finer step.

22. The device according to claim 21, wherein, during said the processing unit is further configured, in verifying if the remaining computing power is sufficient, to evaluate a computing time needed to determine control parameters to be applied to the stepper motor in order for the stepper motor to reach a next position in said current step driving mode, to determine a switching time required by the stepper motor to switch to said next position taking into account a current speed of the stepper motor, and to determine that said remaining computing power is sufficient to allow switching to said driving mode having the closest finer step if said switching time is greater than or equal to said computing time plus a second margin.

23. The device according to claim 22, wherein the second margin comprises a second temporal margin that is greater than a second parameter equal to the difference between the current switching time in said current step driving mode and a next switching time in said driving mode having the closest finer step.

24. The device according to claim 23, wherein if said remaining computer power is not sufficient for allowing switching to said driving mode having the closest finer step, if the difference between the final position and the current position of the stepper motor is smaller than one full step of the current driving mode, and if said final position is not accessible with the current step driving mode, the processing unit is configured to decrease the speed of the stepper motor to obtain a sufficient remaining computer power to allow switching to said driving mode having the closest finer step.

25. The device according to claim 24, wherein said stepper motor includes motor phases, and wherein said second switching condition further comprises a minimum current gap on the motor phases.

26. The device according to claim 25, wherein if said second switching condition is not fulfilled, the processing unit is configured to control the stepper motor to perform a new step in said current step driving mode.

27. The device according to claim 15, wherein the processing unit is further configured to change progressively the current step driving mode until reaching the full step driving mode regardless of the remaining computing power of the processing unit responsive to the stepper motor running at a constant speed.

28. The device according to claim 15, wherein the processing unit is further configured to change progressively the current step driving mode until reaching the driving mode having the finest possible step.

* * * * *